(12) United States Patent
Sato (10) Patent No.: US 11,303,860 B2
(45) Date of Patent: Apr. 12, 2022

(54) PROJECTION DISPLAY UNIT

(71) Applicant: SONY CORPORATION, Tokyo (JP)

(72) Inventor: Yoshihisa Sato, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/320,210

(22) PCT Filed: Jun. 13, 2017

(86) PCT No.: PCT/JP2017/021798
§ 371 (c)(1),
(2) Date: Jan. 24, 2019

(87) PCT Pub. No.: WO2018/025506
PCT Pub. Date: Feb. 8, 2018

(65) Prior Publication Data
US 2019/0238810 A1    Aug. 1, 2019

(30) Foreign Application Priority Data
Aug. 2, 2016 (JP) .............................. JP2016-151709

(51) Int. Cl.
| | | |
|---|---|---|
| *G03B 21/00* | (2006.01) | |
| *H04N 9/31* | (2006.01) | |
| *G02B 3/00* | (2006.01) | |
| *G03B 21/14* | (2006.01) | |
| *G02B 13/16* | (2006.01) | |

(Continued)

(52) U.S. Cl.
CPC .............. *H04N 9/3182* (2013.01); *G02B 3/00* (2013.01); *G02B 13/16* (2013.01); *G03B 21/005* (2013.01); *G03B 21/14* (2013.01); *G03B 21/2013* (2013.01); *G03B 33/12* (2013.01); *H04N 9/3126* (2013.01); *H04N 9/3138* (2013.01); *H04N 9/3164* (2013.01)

(58) Field of Classification Search
CPC .. G03B 21/005; G03B 21/2013; G03B 33/12; H04N 9/3126; H04N 9/3138; H04N 9/3141; H04N 9/3164; H04N 9/3182; G02B 3/00
See application file for complete search history.

(56) References Cited

U.S. PATENT DOCUMENTS

| | | |
|---|---|---|
| 2012/0038693 A1 | 2/2012 | Kang et al. |
| 2012/0133901 A1* | 5/2012 | Miura ................ G03B 21/2013 |
| | | 353/31 |

(Continued)

FOREIGN PATENT DOCUMENTS

| | | |
|---|---|---|
| CN | 102540677 | 7/2012 |
| JP | 2001343706 A | 12/2001 |

(Continued)

OTHER PUBLICATIONS

International Search Report prepared by the Japan Patent Office dated Sep. 7, 2017, for International Application No. PCT/JP2017/021798.

(Continued)

*Primary Examiner* — Dennis P Joseph
(74) *Attorney, Agent, or Firm* — Sheridan Ross P.C.

(57) ABSTRACT

A projection display unit includes a first spatial light modulator that first light enters; and an integrator optical system that second light and light passing through the first spatial light modulator enter.

19 Claims, 9 Drawing Sheets

(51) Int. Cl.
*G03B 21/20* (2006.01)
*G03B 33/12* (2006.01)

(56) References Cited

U.S. PATENT DOCUMENTS

| | | | | |
|---|---|---|---|---|
| 2012/0212724 | A1* | 8/2012 | Osaka | G03F 7/7005 |
| | | | | 355/70 |
| 2013/0208028 | A1 | 8/2013 | Shirai et al. | |
| 2015/0338042 | A1* | 11/2015 | Patton | F21S 6/001 |
| | | | | 348/742 |
| 2017/0006268 | A1 | 1/2017 | Shirai et al. | |
| 2017/0099466 | A1* | 4/2017 | Damberg | H04N 9/3105 |
| 2017/0307969 | A1* | 10/2017 | Kawasumi | G03B 21/2013 |
| 2018/0131913 | A1* | 5/2018 | Nakagoshi | G03B 21/006 |
| 2018/0164665 | A1* | 6/2018 | Gorny | G03B 21/005 |

FOREIGN PATENT DOCUMENTS

| | | |
|---|---|---|
| JP | 2008-089686 | 4/2008 |
| JP | 2010-079156 | 4/2010 |
| JP | 2012-525789 | 10/2012 |
| JP | 2013-222058 | 10/2013 |
| JP | 2015-090496 | 5/2015 |
| JP | 2015-099323 | 5/2015 |
| JP | 2016-009086 | 1/2016 |
| WO | WO 2012/035768 | 3/2012 |
| WO | WO 2015/200138 | 12/2015 |

OTHER PUBLICATIONS

Official Action (with English translation) for Chinese Patent Application No. 201780046430.9, dated Sep. 8, 2020, 15 pages.

* cited by examiner

PROJECTION DISPLAY UNIT

CROSS REFERENCE TO RELATED APPLICATIONS

This application is a national stage application under 35 U.S.C. 371 and claims the benefit of PCT Application No. PCT/JP2017/021798 having an international filing date of 13 Jun. 2017, which designated the United States, which PCT application claimed the benefit of Japanese Patent Application No. 2016-151709 filed 2 Aug. 2016, the entire disclosures of each of which are incorporated herein by reference.

TECHNICAL FIELD

The technology relates to a projection display unit that makes it possible to achieve an HDR (High Dynamic Range).

BACKGROUND ART

In recent years, in the field of image display, technologies of enhancing a dynamic range have been proposed (for example, see PTLs 1 and 2), and in particular an HDR has attracted attention. The HDR refers to expanded gray-scale representation of a low-luminance portion, or an image signal format of high peak luminance. Hitherto, luminance representation as high as 100 cd/m$^2$ has been achieved; however, the demand for high-luminance representation of several dozen times as high as such a luminance level has been growing at present.

CITATION LIST

Patent Literature

PTL 1: Japanese Unexamined Patent Application Publication No. 2015-90496
PTL 2: Japanese Unexamined Patent Application Publication No. 2008-89686

SUMMARY OF THE INVENTION

However, an increase in the dynamic range causes deterioration in optical utilization efficiency.

It is therefore desirable to provide a projection display unit that achieves the high dynamic range while suppressing deterioration in the optical utilization efficiency.

A projection display unit according to an embodiment of the technology includes: a first spatial light modulator that first light enters; and an integrator optical system that second light and light passing through the first spatial light modulator enter.

In the projection display unit according to the embodiment of the technology, the second light and the light passing through the first spatial light modulator enter the integrator optical system, which makes it possible to separate a high-luminance region in an image signal, and to form only the high-luminance region with use of the first spatial light modulator. Further, at the same time, an image to be illuminated from the integrator optical system utilizes the second light, resulting in the luminance being maintained. Another spatial light modulator (a second spatial light modulator) is illuminated with light passing through the integrator optical system, leading to an image depending on the image signal being created in such a spatial light modulator.

According to the projection display unit of the embodiment of the technology, the second light and the light passing through the first spatial light modulator enter the integrator optical system, which makes it possible to selectively form only the high-luminance region using the first spatial light modulator, and to maintain the luminance in a portion other than the high-luminance region. This makes it possible to achieve the high dynamic range in the high-luminance region, as well as to suppress deterioration in the optical utilization efficiency in the portion other than the high-luminance region. It is to be noted that the effects described here are not necessarily limitative, and the effects of the technology may be any of the effects that will be described herein.

DESCRIPTION OF EMBODIMENTS

Hereinafter, embodiments of the technology are described in detail with reference to the drawings. It is to be noted that the description is given in the following order.

1. Embodiment
   An example including an integrator optical system that light from a second light source and light passing through a first spatial light modulator enter
2. Modification Example 1
   An example including a first spatial light modulator that performs phase modulation
3. Modification Example 2
   An example including an integrator optical system provided with a rod integrator
4. Modification Example 3
   An example of full-color display
5. Modification Example 4
   An example of distributing light from a single light source

EMBODIMENT (Configuration)

Figure 1:
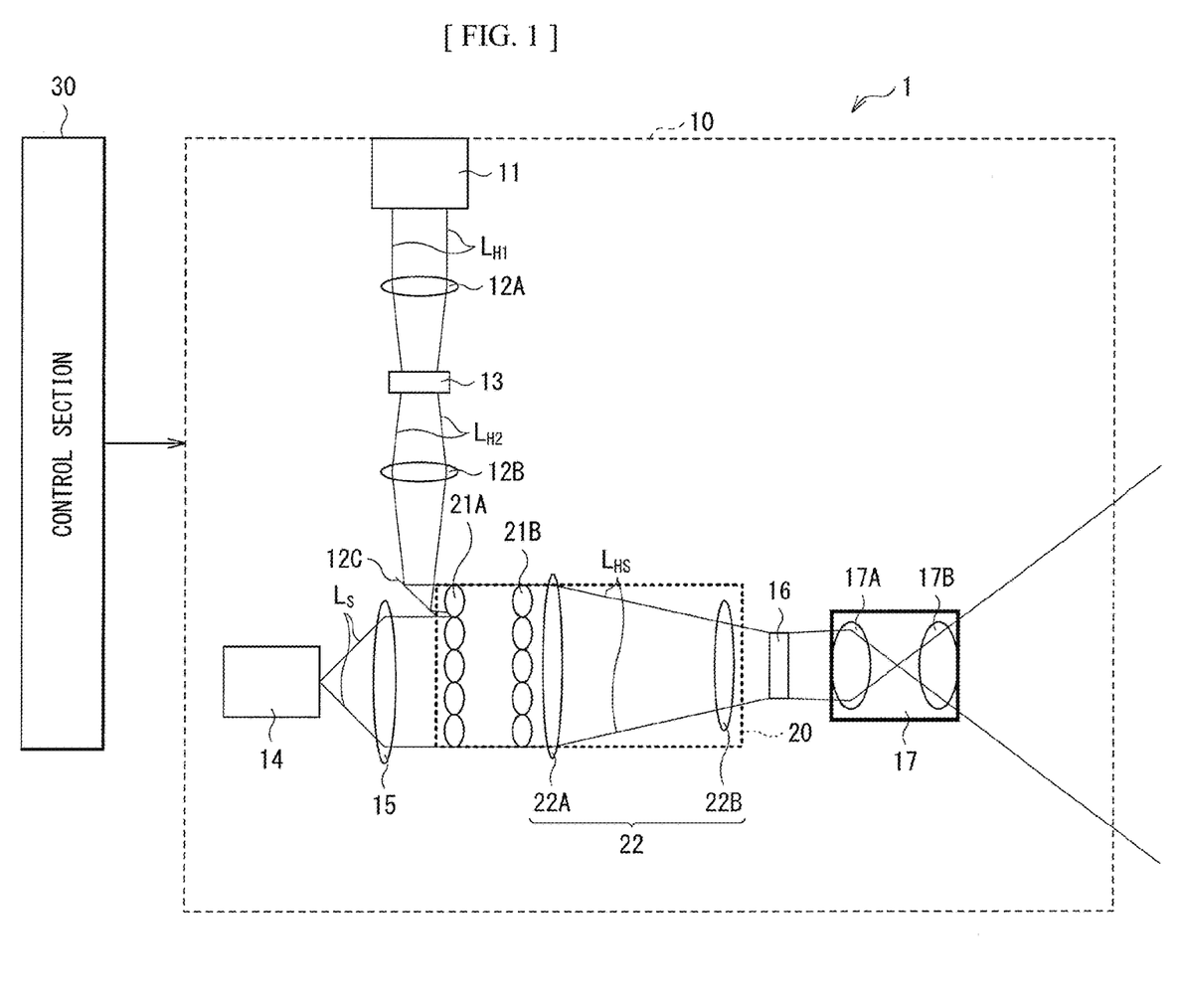
FIG. 1 is a schematic view of an overall configuration of a projection display unit according to an embodiment of the technology.

FIG. 1 is a schematic view of an overall configuration of a projection display unit (a projection display unit 1) according to an embodiment of the technology. The projection display unit 1 is, for example, a display unit that projects images on a screen. The projection display unit 1 is coupled to an external image supply apparatus including, for example, a computer such as a PC, or various image players, etc. through an I/F (interface), and carries out image projection on a screen on the basis of image signals incoming into the I/F. It is to be noted that a configuration of the projection display unit 1 to be described below is illustrative only, and the projection display unit of the technology is not limited to such a configuration.

The projection display unit 1 includes an optical section 10, and a control section 30 that controls operation of the optical section 10. The optical section 10 includes a first light source 11 and a second light source 14, and an integrator optical system 20. In addition, the optical section 10 is provided with a first illumination optical system 12A, a first spatial light modulator 13, a second illumination optical system 12B, and an optical path conversion element 12C at an optical path of light (HDR light $L_{H1}$) emitted from the first light source 11; a third illumination optical system 15 at an optical path of light (SDR light $L_S$) emitted from the second light source 14; and a second spatial light modulator 16 and a projection optical system 17 at an optical path of light passing through the integrator optical system 20. As described hereinafter in detail, the HDR light $L_{H1}$ emitted from the first light source 11 passes through the first illumination optical system 12A, the first spatial light modulator 13, and the second illumination optical system 12B, forming an image in a high-luminance region. In other words, the first light source 11, the first illumination optical system 12A, the first spatial light modulator 13, and the second illumination optical system 12B are HDR optical systems that allow for generation of the image in the high-luminance region having peak luminance. In the present embodiment, the HDR light $L_{H1}$ corresponds to a specific example of first light, and the SDR light $L_S$ corresponds to a specific example of second light.

The first light source 11 and the second light source 14 are each, for example, a solid-state light source such as a semiconductor laser (LD) or a light-emitting diode. Each of the first light source 11 and the second light source 14 may include a light source using a wavelength conversion material such as a phosphor, or may include a discharge lamp. On an as-needed basis, the optical section 10 may be provided with a polarization conversion element that converts light emitted from the first light source 11 and the second light source 14 into linear polarized light. Each of the first light source 11 and the second light source 14 may include a single solid-state light source, or may include a plurality of solid-state light sources.

Each of the first illumination optical system 12A, the second illumination optical system 12B, and the third illumination optical system 15 includes, for example, a lens group, or a single lens, etc. The optical path conversion element 12C includes, for example, a mirror, etc. The first illumination optical system 12A serves to illuminate the first spatial light modulator 13 with the HDR light $L_{H1}$ emitted from the first light source 11, and is provided at an optical path between the first light source 11 and the first spatial light modulator 13. The second illumination optical system 12B serves to guide HDR light (HDR light $L_{H2}$) that has been subjected to spatial light modulation at the first spatial light modulator 13 toward the integrator optical system 20 (more specifically, a fly-eye lens 21A to be described later). The HDR light $L_{H2}$ passing through the second illumination optical system 12B is changed in a travelling direction thereof by, for example, the optical path conversion element 12C, and is guided to the integrator optical system 20. The third illumination optical system 15 collimates the SDR light $L_S$ emitted from the second light source 14 to cause such light to enter the integrator optical system 20, and is provided at an optical path between the second light source 14 and the integrator optical system 20 (more specifically, the fly-eye lens 21A to be described later).

Each of the first spatial light modulator 13 and the second spatial light modulator 16 includes, for example, a transmissive liquid crystal panel. The liquid crystal panel is provided with a polarization element at each of light input/output sections thereof, which allows for light intensity modulation. The first spatial light modulator 13 modulates the HDR light $L_{H1}$ that is emitted from the first light source 11 to pass through the first illumination optical system 12A. The first spatial light modulator 13 generates the modulated HDR light $L_{H2}$. The first spatial light modulator 13 is provided at an optical path between the first illumination optical system 12A and the second illumination optical system 12B. An image formed in the first spatial light modulator 13 is to be formed at a position conjugated by the second illumination optical system 12B. The second spatial light modulator 16 modulates light (integrated light $L_{HS}$) passing through the integrator optical system 20. The second spatial light modulator 16 is provided at an optical path between the integrator optical system 20 (more specifically, a lens 22B to be described later) and the projection optical system 17. An image formed in the second spatial light modulator 16 is magnified to be projected through the projection optical system 17. Each of the first spatial light modulator 13 and the second spatial light modulator 16 may use a reflective liquid crystal panel, or a mirror device using a micromirror.

The integrator optical system 20 includes, for example, two pairs of fly-eye lenses (first fly-eye lenses 21A and second fly-eye lenses 21B), and a fourth illumination optical system 22. The fourth illumination optical system 22 includes, for example, a first lens 22A and a second lens 22B. In the present embodiment, the HDR light $L_{H2}$ that is emitted from the first light source 11 to be modulated by the first spatial light modulator 13, and the SDR light $L_S$ emitted from the second light source 14 enter the integrator optical system 20, forming the integrated light $L_{HS}$. As described hereinafter in detail, this ensures that only an image in a high-luminance region in an incoming image signal is selectively generated by the first spatial light modulator 13

(the HDR light $L_{H2}$), and the SDR light $L_S$ is utilized in any portion other than the high-luminance region. This makes it possible to achieve the high dynamic range in the high-luminance region, and to suppress deterioration in the optical utilization efficiency in any portion other than the high-luminance region.

The integrator optical system 20 serves to generate the integrated light $L_{HS}$ by superimposing the HDR light $L_{H2}$ modulated by the first spatial light modulator 13 and the SDR light $L_S$ emitted from the second light source 14 onto uniformly-formed light, and to guide such integrated light $L_{HS}$ to the second spatial light modulator 16. In other words, an image generated by the first spatial light modulator 13 is superimposed onto the SDR light $L_S$ emitted from the second light source 14 to be formed in the second spatial light modulator 16. Each of the first fly-eye lenses 21A and second fly-eye lenses 21B includes a plurality of lens elements (for example, elements 21AL to be described later in FIGS. 2A to 2D). A focal length each of the lens elements of the first fly-eye lenses 21A and a focal length each of the lens elements of the second fly-eye lenses 21B are substantially equal to each other. A distance between the first fly-eye lenses 21A and the second fly-eye lenses 21B is identical to a value of such a focal length, for example. Alternatively, the distance between the first fly-eye lenses 21A and the second fly-eye lenses 21B may be a value close to the value of such a focal length. The fourth illumination optical system 22 serves to guide light that is uniformly formed through the first fly-eye lenses 21A and the second fly-eye lenses 21B to the second spatial light modulator 16. At optical paths leading from the second illumination optical system 12B and the third illumination optical system 15 (optical paths of the HDR light $L_{H2}$ and the SDR light $L_S$), for example, the first fly-eye lenses 21A, the second fly-eye lenses 21B, the first lens 22A, and the second lens 22B are disposed in this order.

Figure 2A:
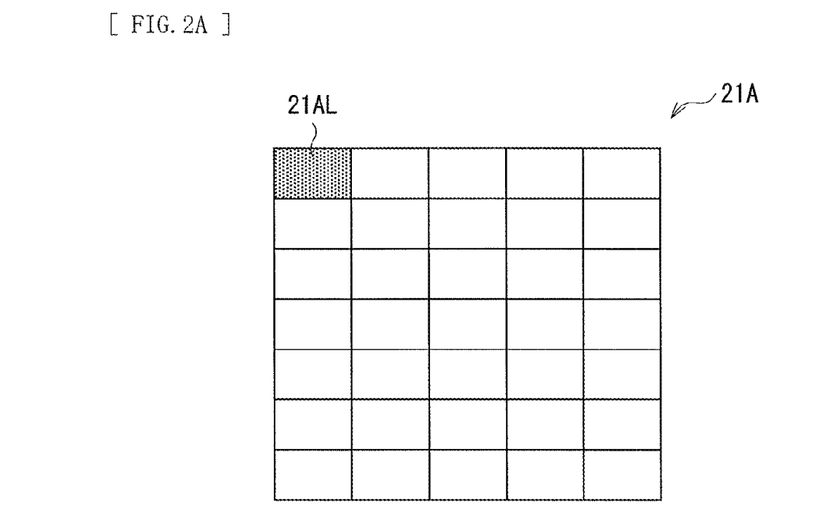
FIG. 2A is a plan view of an example of a position of HDR light $L_{H2}$ entering a first fly-eye lens illustrated in FIG. 1.
Figure 2B:
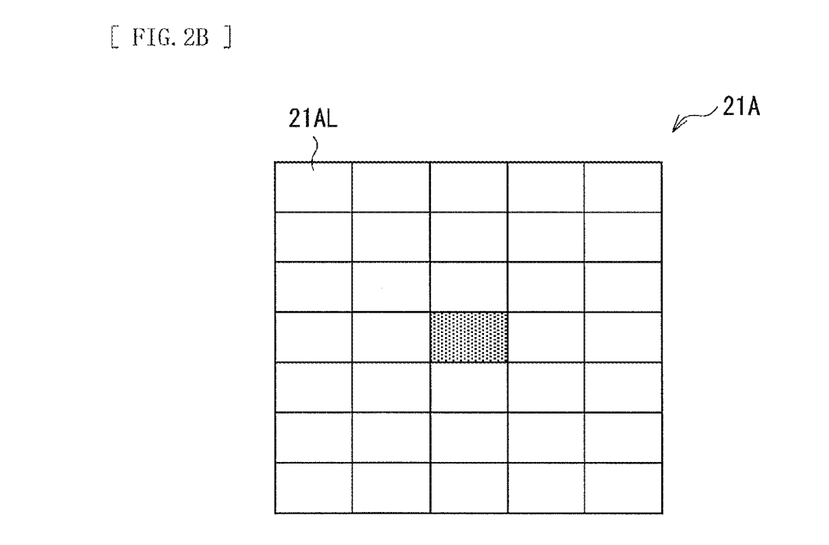
FIG. 2B is a plan view of another example (1) of a position of the HDR light $L_{H2}$ entering the first fly-eye lens illustrated in FIG. 1.
Figure 2C:
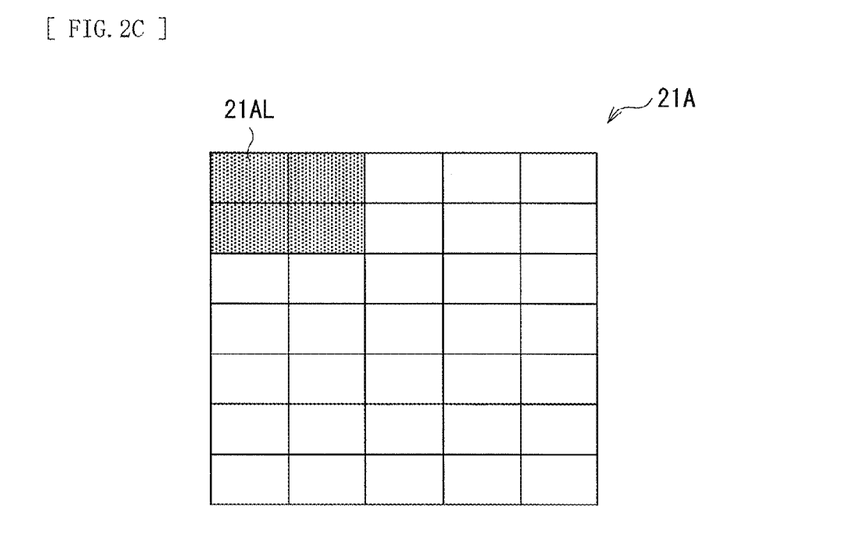
FIG. 2C is a plan view of still another example (2) of a position of the HDR light $L_{H2}$ entering the first fly-eye lens illustrated in FIG. 1.
Figure 2D:
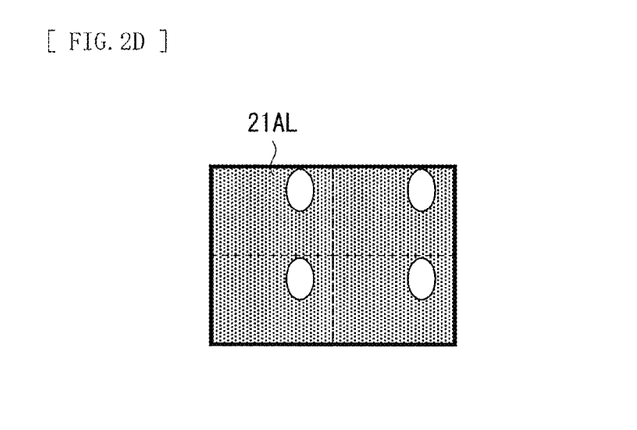
FIG. 2D is a plan view of an example of an image to be formed on the first fly-eye lens illustrated in FIG. 2C.

The HDR light $L_{H2}$ modulated by the first spatial light modulator 13 passes through the second illumination optical system 12B, and thereafter is imaged on a single element 21AL disposed at a corner of the first fly-eye lenses 21A, as illustrated in FIG. 2A, for example. Alternatively, the HDR light $L_{H2}$ may be imaged on the single element 21AL disposed at a center of the first fly-eye lenses 21A, as illustrated in FIG. 2B. Further, as an alternative, the HDR light $L_{H2}$ modulated by the first spatial light modulator 13 may be imaged on the plurality of elements 21AL (2×2 in FIG. 2C), as illustrated in FIG. 2C. In a case where imaging is performed on the plurality of elements 21AL, identical images may be formed on the respective elements 21AL as illustrated in FIG. 2D, or images that are different from one other may be formed (unillustrated). In either case where identical images are formed, or different images are formed, these images are superimposed on one another through the integrator optical system 20.

The SDR light $L_S$ emitted from the second light source 14 passes through the third illumination optical system 15, and thereafter enters the element 21AL that the HDR light $L_{H2}$ does not enter in the first fly-eye lenses 21A, for example. Alternatively, the SDR light $L_S$ may enter the element 21AL that the HDR light $L_{H2}$ enters. The SDR light $L_S$ is uniformized together with the HDR light $L_{H2}$ at the integrator optical system 20, and the second spatial light modulator 16 is irradiated with such SDR light $L_S$. For example, when the HDR light $L_H$) enters the single element 21AL (for example, FIGS. 2A and 2B), the SDR light $L_S$ enters the plurality of remaining elements 21AL. Alternatively, the HDR light $L_{H2}$ may enter half of all the elements 21AL, and the SDR light $L_S$ may enter the remaining half.

The projection optical system 17 serves to project light modulated by the second spatial light modulator 16 on a screen for imaging, and includes, for example, a first projection lens 17A and a second projection lens 17B.

Figure 3:
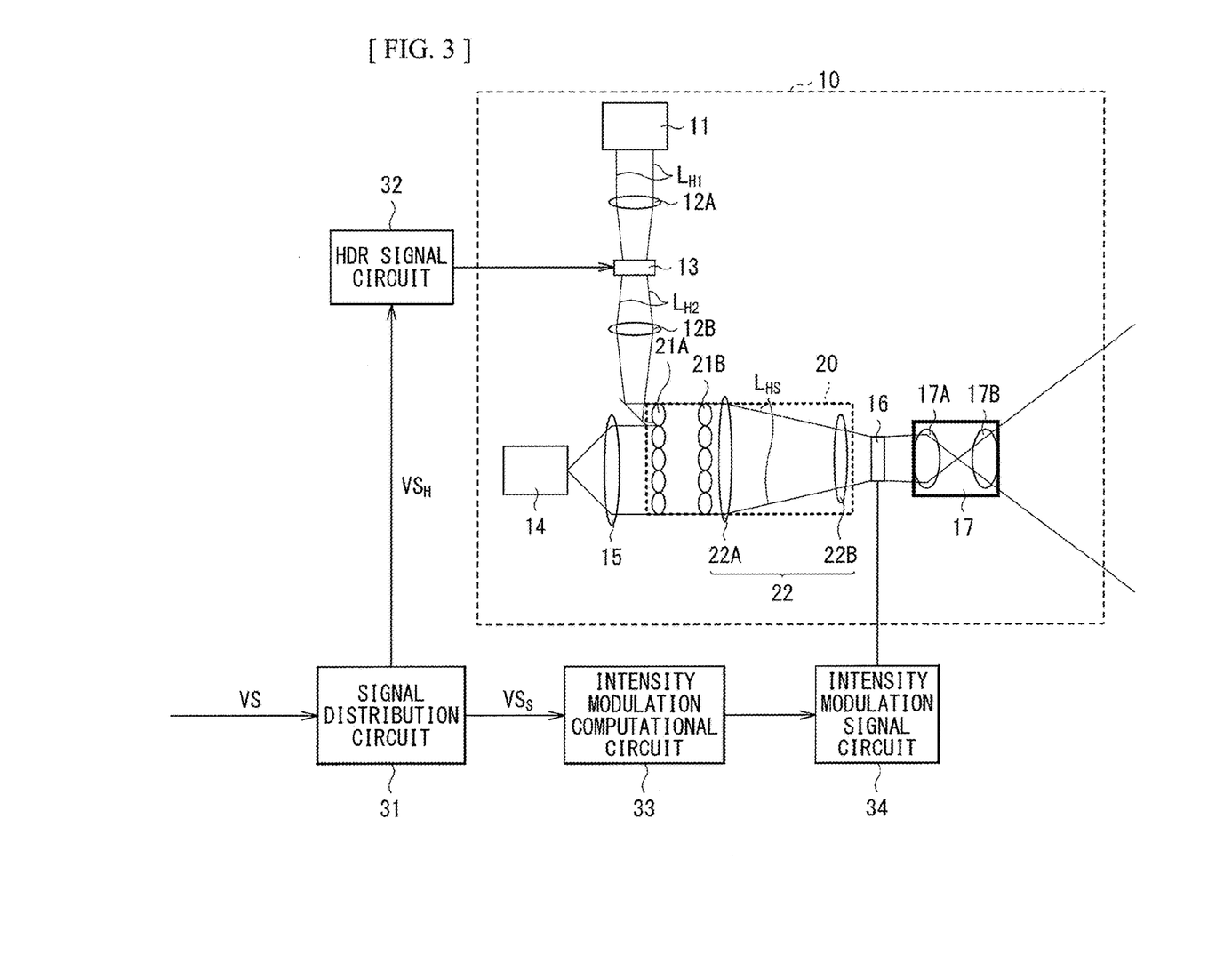
FIG. 3 is a schematic view of an example of a configuration of a control section illustrated in FIG. 1 along with a configuration of an optical section.

The control section 30 includes, for example, a signal distribution circuit 31, an HDR signal circuit 32, an intensity modulation computational circuit 33, and an intensity modulation signal circuit 34, as illustrated in FIG. 3.

The signal distribution circuit 31 distributes a signal $VS_H$ to be transmitted to the HDR signal circuit 32 and a signal $VS_S$ to be transmitted to the intensity modulation computational circuit 33 in an image signal VS incoming from the outside. Information concerning a high-luminance region in the image signal VS is transmitted to the HDR signal circuit 32. In consideration of such information to be transmitted to the HDR signal circuit 32, information for generating an image based on the image signal VS in the second spatial light modulator 16 is transmitted to the intensity modulation computational circuit 33.

The HDR signal circuit 32 serves to generate a signal for driving the first spatial light modulator 13 on the basis of the signal $VS_H$ from the signal distribution circuit 31, and the generated signal is transmitted to a drive section (unillustrated) of the first spatial light modulator 13. With use of such a signal from the HDR signal circuit 32, an image in the high-luminance region is generated by the first spatial light modulator 13.

The intensity modulation computational circuit 33 calculates a signal to be transmitted to the intensity modulation signal circuit 34 on the basis of the signal $VS_S$ from the signal distribution circuit 31, a light-emitting state of the second light source 14, etc. The intensity modulation signal circuit 34 generates a signal for driving the second spatial light modulator 16 on the basis of the signal transmitted from the intensity modulation computational circuit 33 to transmit such a resulting signal to a drive section (unillustrated) of the second spatial light modulator 16.

(Operation)

Figure 4A:
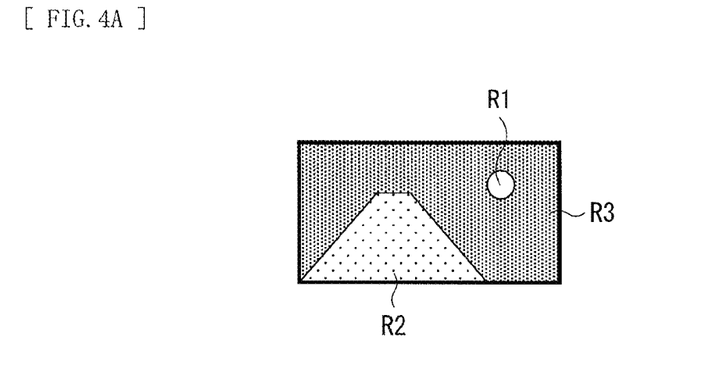
FIG. 4A is a plan view of an example of an image to be inputted into a signal distribution circuit illustrated in FIG. 3.

Hereinafter, the description is provided on operation of the projection display unit 1 of the present embodiment with reference to FIG. 3 and FIGS. 4A to 4D. The description is provided by citing an example where an image illustrated in FIG. 4A is inputted from the outside as the image signal VS. FIG. 4A includes a region 1R1 of a moon portion, a region 2R2 of a mountain portion, and a region 3R3 of a background. The image has, for example, luminance levels of 1000, 50, and 0 in the regions 1R1, 2R2, and 3R3, respectively. In other words, a ratio of the luminance level in the region 1R1 to the region 2R2 is 20 to 1.

The signal distribution circuit 31 selects information concerning the high-luminance region in the image signal VS, for example, information concerning the region 1R1 in FIG. 4A to transmit such information to the HDR signal circuit 32 as the signal $VS_H$. The HDR signal circuit 32 controls the drive section of the first spatial light modulator 13 to ensure that the first spatial light modulator 13 generates an image having only the region 1R1 (FIG. 4B).

Figure 4B:
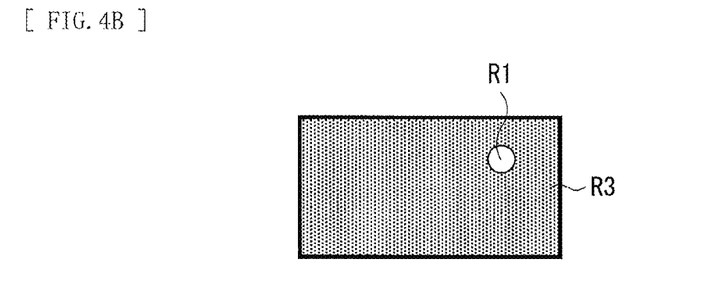
FIG. 4B is a plan view of an example of an image in a high-luminance region to be transmitted to an HDR signal circuit illustrated in FIG. 3.

The first light source 11 and the first spatial light modulator 13 are driven, leading to generation of the image illustrated in FIG. 4B in the first spatial light modulator 13. The image in FIG. 4B is formed on the single element 21AL or the plurality of elements 21AL of the first fly-eye lens 21A (the HDR light $L_{H2}$).

Figure 4C:
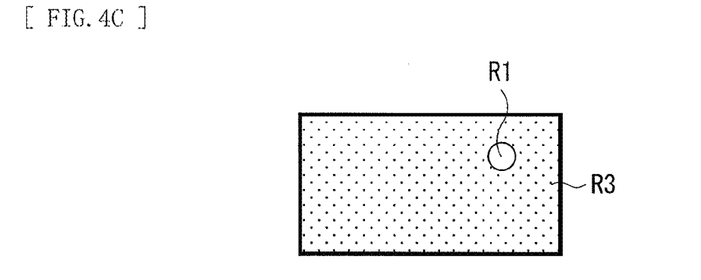
FIG. 4C is a plan view of an example of an image to be illuminated on a second spatial light modulator from an integrator optical system illustrated in FIG. 3.

Meanwhile, when the second light source 14 is driven, the SDR light $L_S$ from the second light source also enters the first fly-eye lens 21A. In the integrator optical system 20, the HDR light $L_{H2}$ from the first spatial light modulator 13 and the SDR light $L_S$ from the second light source are synthesized with uniformized light (the integrated light $L_{HS}$), and the second spatial light modulator 16 is irradiated with such resulting light. The integrated light $L_{HS}$ is imaged on the second spatial light modulator 16 as an image illustrated in FIG. 4C, for example. In FIG. 4C, for example, the luminance of the region 1R1 is 2000 cd/m$^2$, and the luminance of the region 2R2 is 100 cd/m$^2$.

Figure 4D:
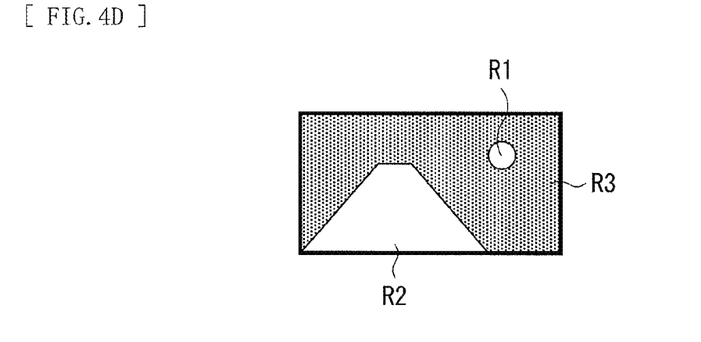
FIG. 4D is a plan view of an example of an image to be transmitted to drive the second spatial light modulator from an intensity modulation signal circuit illustrated in FIG. 3.

Considering that the second spatial light modulator 16 is irradiated with the image in FIG. 4C on the basis of the signal $VS_S$ from the signal distribution circuit 31 and a light-emitting state of the second light source 14, etc., the intensity modulation computational circuit 33 transmits a signal to the intensity modulation signal circuit 34. The intensity modulation signal circuit 34 transmits a signal to the drive section of the second spatial light modulator 16 to ensure that an image illustrated in an example in FIG. 4D is generated. The image in FIG. 4D has, for example, luminance levels of 100, 100, and 0 in the regions 1R1, 2R2, and 3R3, respectively. Such an image generated by the second spatial light modulator 16 and the image (FIG. 4C) that is formed on the second spatial light modulator 16 from the integrator optical system 20 are synthesized to be projected on a screen by the projection optical system 17. An image projected on the screen has a ratio of the luminance level in the region 1R1 to the region 2R2 of 20 to 1. In other words, an output is provided based on the image signal VS.

(Workings and Effects)

In the projection display unit 1 of the present embodiment, the SDR light $L_S$ from the second light source 14 and the HDR light $L_{H2}$ passing through the first spatial light modulator 13 enter the integrator optical system 20. This makes it possible to separate the signal $VS_H$ related to the high-luminance region in the image signal VS, and to generate only an image in the high-luminance region using the first spatial light modulator 13. The second spatial light modulator 16 is illuminated with the integrated light $L_{HS}$ passing through the integrator optical system 20, and such light is synthesized with an image generated by the second spatial light modulator 16. This allows for achievement of the high dynamic range, as well as suppression of deterioration in the optical utilization efficiency. The description on this matter is given below.

Typically, deterioration in the optical utilization efficiency will pose an issue in achieving the HDR. For example, in an HDR technique, intensity modulation is performed twice to allow a black (low-luminance) display regional portion to be made blacker. In such a case, however, the two-time intensity modulation significantly reduces the optical utilization efficiency. Alternatively, it is also possible to achieve the HDR by combining the phase modulation and the intensity modulation. However, the diffraction-based phase modulation is performed in this case, and therefore low diffractive efficiency causes deterioration in the optical utilization efficiency as well. Such an HDR technique causes a decrease in the absolute amount of light, resulting in lower visibility of images under a bright viewing environment. It is necessary to increase a drive power of light sources to increase the absolute amount of light. In other words, this results in an increase in the power consumption.

In contrast, in the present embodiment, an image in the high-luminance region (for example, FIG. 4B) is selected by the signal distribution circuit 31, and such an image is generated by the first spatial light modulator 13. In such a manner, the image in the high-luminance region having peak luminance is formed in the first spatial light modulator 13. In other words, it is possible to achieve the high dynamic range in the high-luminance region. Further, along with the HDR light $L_{H2}$ passing through the first spatial light modulator 13, the SDR light $L_S$ from the second light source 14 enters the integrator optical system 20. This ensures that the predetermined luminance is maintained at any portion other than the high-luminance region. In other words, deterioration in the optical utilization efficiency is suppressed at any portion other than the high-luminance region. This makes it possible to reduce drive power for the first light source 11 and the second light source 14, as well as an increase in the power consumption.

As described above, in the present embodiment, the SDR light $L_S$ from the second light source 14 and the HDR light $L_{H2}$ passing through the first spatial light modulator 13 enter the integrator optical system 20, allowing for achievement of the high dynamic range, as well as suppression of deterioration in the optical utilization efficiency.

Next, the description is provided on modification examples of the above-described embodiment. Hereinafter, any component parts common to those in the above-described embodiment are denoted with the same reference numerals, and the related descriptions are omitted as appropriate.

Modification Example 1

Figure 5:
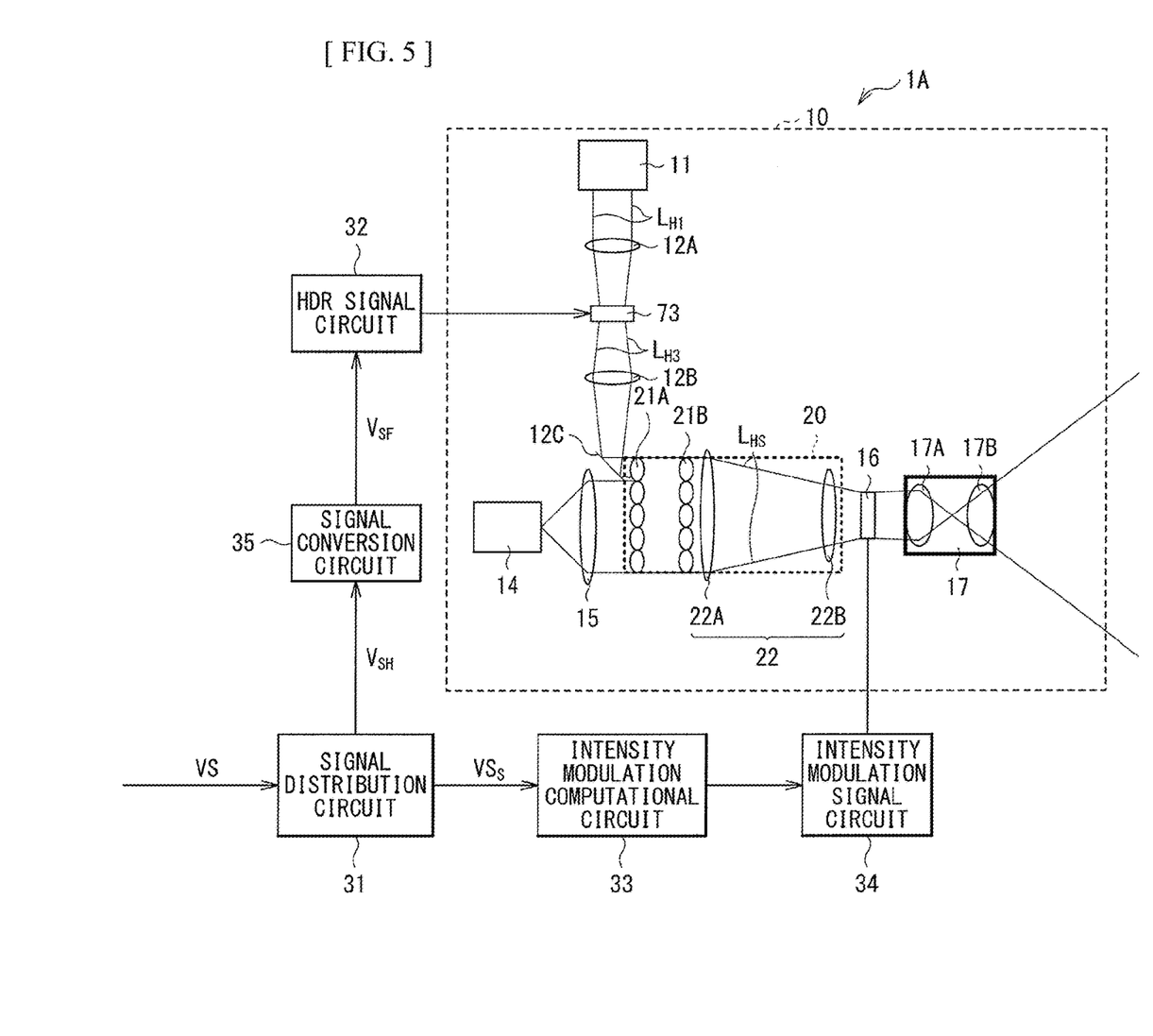
FIG. 5 is a schematic view of an overall configuration of a projection display unit according to a modification example 1.

FIG. 5 schematically illustrates an overall configuration of a projection display unit (a projection display unit 1A) according to a modification example 1. The projection display unit 1A has a first spatial light modulator 73 in place of the first spatial light modulator 13 in the above-described embodiment. The first spatial light modulator 73 carries out phase modulation. In this respect, the projection display unit 1A differs from the projection display unit 1.

The first spatial light modulator 73 includes, for example, a liquid crystal panel or a mirror device. The first spatial light modulator 73 performs the phase modulation for the HDR light $L_{H1}$ that is emitted from the first light source 11 to pass through the first illumination optical system 12A. From the first spatial light modulator 73, phase-modulated diffracted light $L_{H3}$ is outputted. As with the first spatial light modulator 13, the first spatial light modulator 73 is provided at an optical path between the first illumination optical system 12A and the second illumination optical system 12B. With use of the diffracted light $L_{H3}$ from the first spatial light modulator 73, a spatial image is formed through the second illumination optical system 12B. The first spatial light modulator 73 that performs the phase modulation allows light to be distributed among pixel regions. In other words, light is distributed from pixels in a low-luminance region to pixels in a high-luminance region, thereby allowing the HDR light $L_{H1}$ from the first light source 11 to concentrate on the high-luminance region. This also makes it possible to suppress deterioration in the optical utilization efficiency of the HDR light $L_{H1}$ from the first light source 11. In a case where the first spatial light modulator 73 is provided, the first light source 11 preferably includes a laser light source. The first light source 11 that includes the laser light source allows for emission of high-coherent light.

The projection display unit 1A includes, for example, a signal conversion circuit 35 at the control section 30. The signal conversion circuit 35 performs Fourier transformation for a high-luminance region signal $V_{SH}$ transmitted from the signal distribution circuit 31 to transmit the signal $V_{SF}$ subjected to Fourier-transformation to the HDR signal circuit 32. On the first spatial light modulator 73, a diffraction grating is configured by an applied signal, performing phase modulation of incoming light. The HDR signal circuit 32 drives the first spatial light modulator 73 on the basis of the signal $V_{SF}$, thereby forming the diffracted light $L_{H3}$.

As with the above-described projection display unit 1, the projection display unit 1A allows for achievement of the high dynamic range, as well as suppression of deterioration in the optical utilization efficiency. In addition, this suppresses deterioration in the utilization efficiency of the light passing through the first spatial light modulator 73 from the first light source 11. In other words, it is possible to suppress deterioration in the optical utilization efficiency also in the high-luminance region.

Modification Example 2

Figure 6:
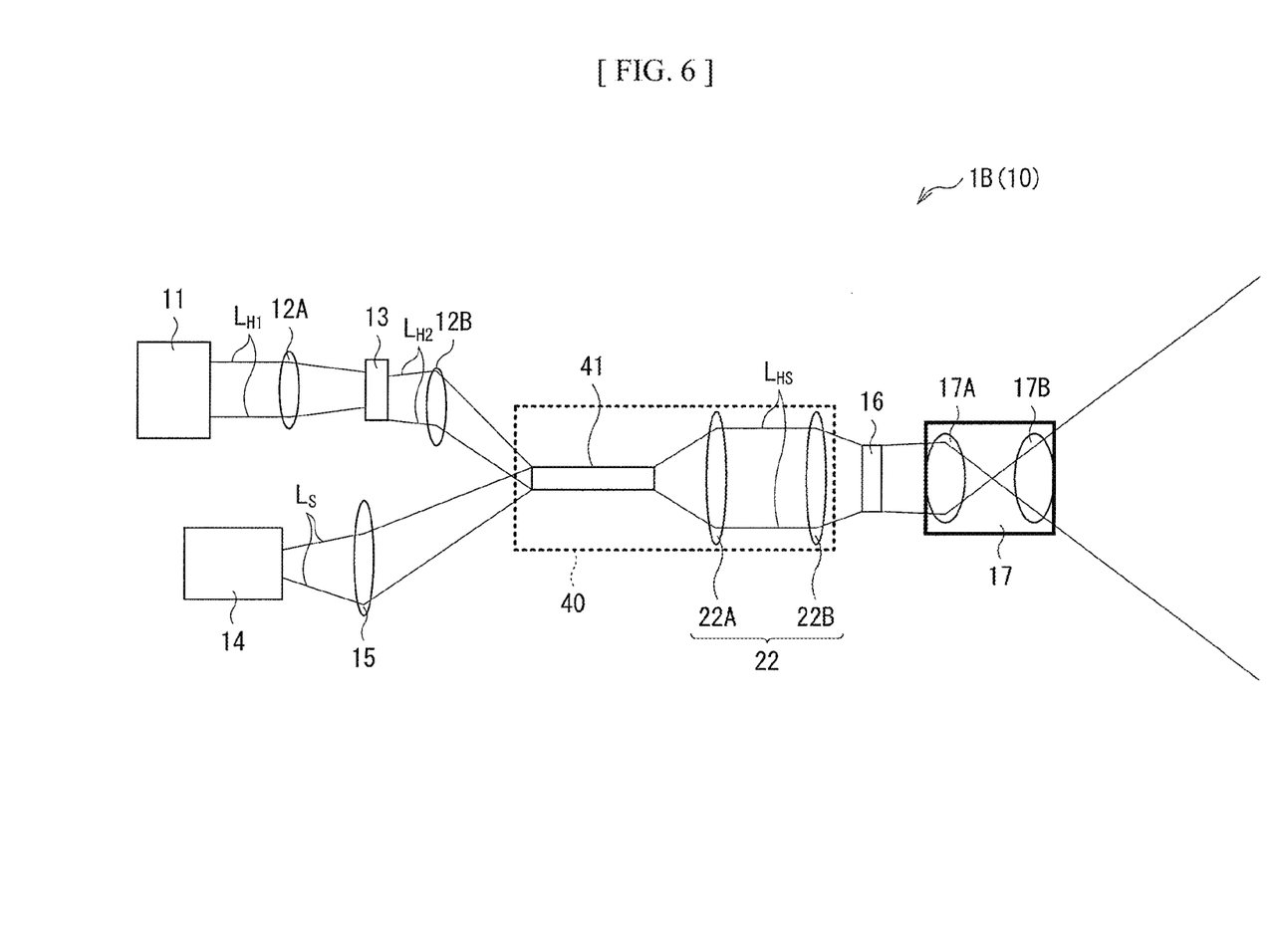
FIG. 6 is a schematic view of a configuration of an optical section of a projection display unit according to a modification example 2.

FIG. 6 schematically illustrates a configuration of an optical section 10 of a projection display unit (a projection display unit 1B) according to a modification example 2. The projection display unit 1B has an integrator optical system 40 that includes a rod integrator 41 in place of the integrator optical system 20 in the above-described embodiment. In this respect, the projection display unit 1B differs from the projection display unit 1.

The integrator optical system 40 includes, for example, the rod integrator 41 and the fourth illumination optical system 22. For example, the rod integrator 41, the first lens 22A, and the second lens 22B are disposed in this order from the side that the light from the second illumination optical system 12B and the third illumination optical system 15 (the HDR light $L_{H2}$ and the SDR light $L_S$) enters. The rod integrator 41 includes, for example, a glass rod having a cylindrical shape or a prismatic shape such as a quadrangular prism. When the SDR light $L_{SH}$ emitted from the second light source 14 and the HDR light $L_{H2}$ from the first spatial light modulator 13 enter an end surface of the rod integrator 41, total reflection is repeated inside the rod integrator 41 to output such incoming light as the uniform integrated light $L_{HS}$. In other words, the rod integrator 41 undertakes a role similar to that of the first fly-eye lens 21A and the second fly-eye lens 21B of the above-described embodiment. The second spatial light modulator 16 is irradiated with the integrated light $L_{HS}$ by the fourth illumination optical system 22. The first spatial light modulator 73 of the above-described modification example 1 may be provided in place of the first spatial light modulator 13.

As with the above-described projection display unit 1, the projection display unit 1B allows for achievement of the high dynamic range, as well as suppression of deterioration in the optical utilization efficiency.

Modification Example 3

Figure 7:
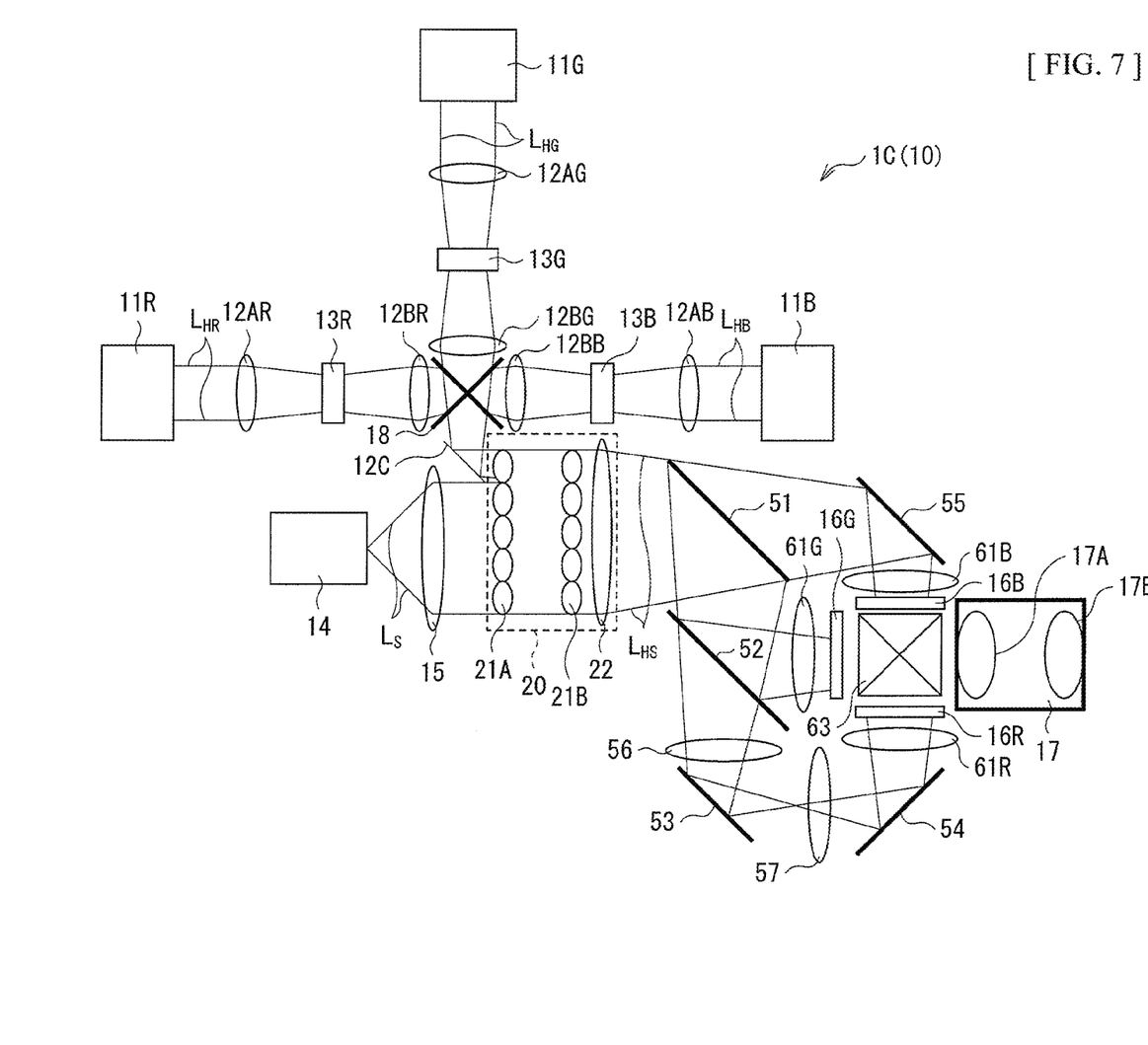
FIG. 7 is a schematic view of a configuration of an optical section of a projection display unit according to a modification example 3.

FIG. 7 schematically illustrates a configuration of an optical section 10 of a projection display unit (a projection display unit 1C) according to a modification example 3. The projection display unit 1C has a red HDR optical system, a blue HDR optical system, and a green HDR optical system as HDR optical systems that allow for generating images in the high-luminance region having peak luminance. In other words, the projection display unit 1C enables full-color display.

In the projection display unit 1C, a red light source 11R, a red first illumination optical system 12AR, a red first spatial light modulator 13R, and a red second illumination optical system 12BR are provided as the red HDR optical system. Similarly, a green light source 11G, a green first illumination optical system 12AG, a green first spatial light modulator 13G, and a green second illumination optical system 12BG are provided as the green HDR optical system. Further, a blue light source 11B, a blue first illumination optical system 12AB, a blue first spatial light modulator 13B, and a blue second illumination optical system 12BB are provided as the blue HDR optical system. Red light, green light, and blue light outputted from the red HDR optical system, the blue HDR optical system, and the green HDR optical system respectively enter a color synthesizing element 18. In the projection display unit 1C, light synthesized by the color synthesizing element 18 is guided to the optical path conversion element 12C and enters the integrator optical system 20. The color synthesizing element 18 includes, for example, a dichroic mirror.

At an optical path of red HDR light $L_{HR}$ emitted from the red light source 11R, the red first illumination optical system 12AR, the red first spatial light modulator 13R, and the red second illumination optical system 12BR are disposed in this order from a position closer to the red light source 11R. The red first spatial light modulator 13R may be of either an intensity modulation type or a phase modulation type. The red HDR light $L_{HR}$ emitted from the red light source 11R enters the red first spatial light modulator 13R through the red first illumination optical system 12AR. The red HDR light $L_{HR}$ entering the red first spatial light modulator 13R is intensity-modulated or phase-modulated to enter the color synthesizing element 18 through the red second illumination optical system 12BR.

At an optical path of green HDR light $L_{HG}$ emitted from the green light source 11G the green first illumination optical system 12AG the green first spatial light modulator 13G, and the green second illumination optical system 12BG are disposed in this order from a position closer to the green light source 11G. The green first spatial light modulator 13G may be of either an intensity modulation type or a phase modulation type. The green HDR light $L_{HG}$ emitted from the green light source 11G enters the green first spatial light modulator 13G through the green first illumination optical system 12AG. The green HDR light $L_{HG}$ entering the green first spatial light modulator 13G is intensity-modulated or phase-modulated to enter the color synthesizing element 18 through the green second illumination optical system 12BG.

At an optical path of blue HDR light $L_{HB}$ emitted from the blue light source 11B, the blue first illumination optical system 12AB, the blue first spatial light modulator 13B, and the blue second illumination optical system 12BB are disposed in this order from a position closer to the blue light source 11B. The blue first spatial light modulator 13B may be of either an intensity modulation type or a phase modulation type. The blue HDR light $L_{HB}$ emitted from the blue light source 11B enters the blue first spatial light modulator 13B through the blue first illumination optical system 12AB. The green HDR light $L_{HB}$ entering the blue first spatial light modulator 13B is intensity-modulated or phase-modulated to enter the color synthesizing element 18 through the blue second illumination optical system 12BB.

The second light source 14 is, for example, a white light source. In the projection display unit 1C, the SDR light $L_S$ that is emitted from the second light source 14 to pass through the third illumination optical system 15, and light synthesized by the color synthesizing element 18 enter the integrator optical system 20.

The integrated light $L_{HS}$ that is generated through the integrator optical system 20 is color-separated by color separator elements 51 and 52 such as dichroic mirrors, and thereafter is guided to a red second spatial light modulator 16R, a green second spatial light modulator 16G, and a blue second spatial light modulator 16B. For example, firstly, the integrated light $L_{HS}$ is separated into red light, green light, and blue light by the color separator element 51. The blue light is applied to the blue second spatial light modulator 16B by an optical path conversion element 55. For example, a lens 61B is provided at an optical path between the optical path conversion element 55 and the blue second spatial light modulator 16B. After passing through the color separator element 51, the red light and the green light further enter the color separator element 52 to be separated into red light and green light. Such red light is converted in optical path thereof in sequence by an optical path conversion element 53 and an optical path conversion element 54, and is applied to the red second spatial light modulator 16R. For example, a lens 57 is provided between the optical path conversion element 53 and the optical path conversion element 54, and a lens 61R is provided between the optical path conversion element 54 and the red second spatial light modulator 16R. After passing through the color separator element 52, the green light is applied to the green second spatial light modulator 16G through a mirror 61G. Each of the optical path conversion elements 53, 54, and 55 includes, for example, a mirror, etc.

The red light, the green light, and the blue light that are respectively modulated by the red second spatial light modulator 16R, the green second spatial light modulator 16G, and the blue second spatial light modulator 16B enter a color synthesizing element 63 such as a polarization beam splitter, for example. Light synthesized by the color synthesizing element 63 enters the projection optical system 17.

As with the above-described projection display unit 1, even such a projection display unit 1C of a full-color display type allows for achievement of the high dynamic range, as well as suppression of deterioration in the optical utilization efficiency.

Modification Example 4

Figure 8:
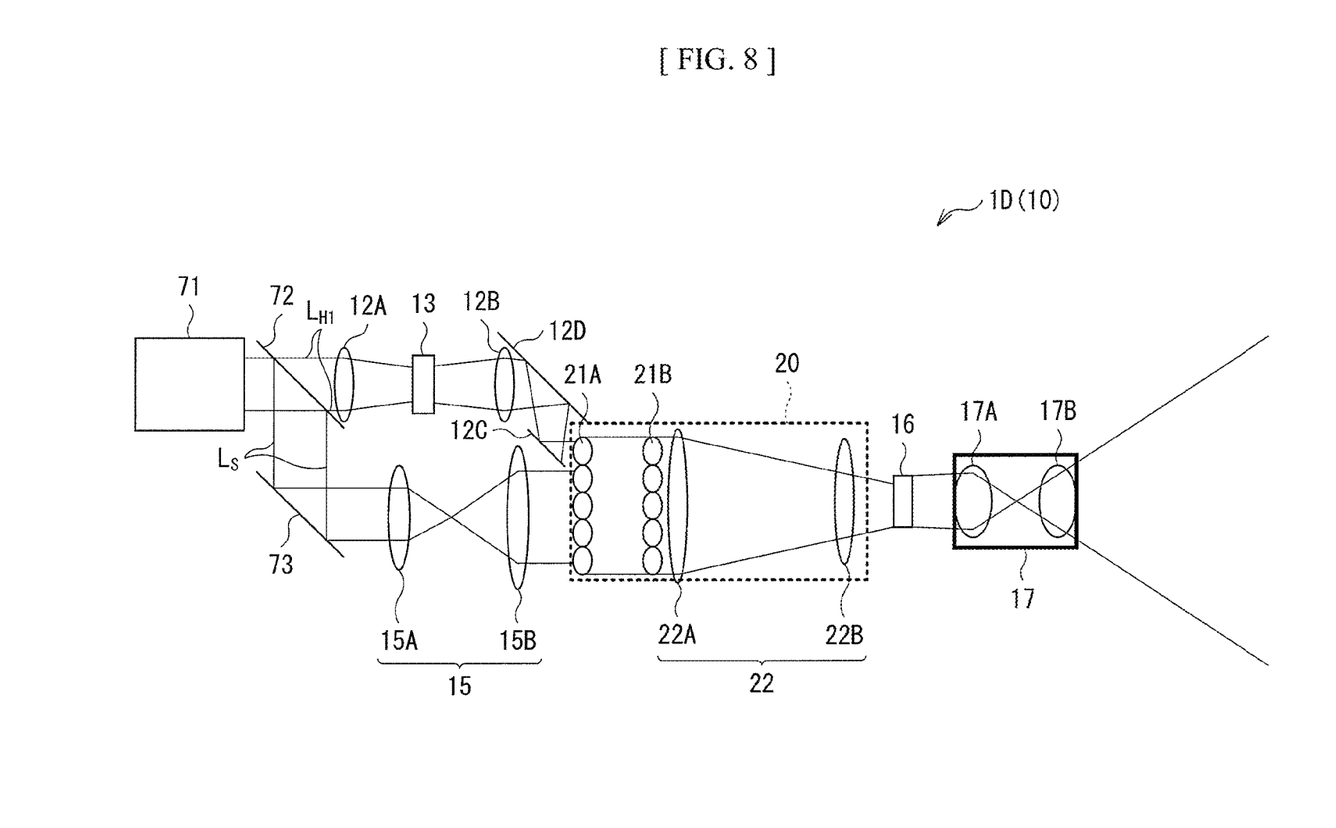
FIG. 8 is a schematic view of a configuration of an optical section of a projection display unit according to a modification example 4.

FIG. 8 schematically illustrates a configuration of an optical section 10 of a projection display unit (a projection display unit 1D) according to a modification example 4. As in the projection display unit 1D, the HDR light $L_{H1}$ and the SDR light $L_S$ may be formed by distributing light from a single light source (a light source 71). The light distribution is performed by a light distribution element (a light distribution element 72). The light distribution element 72 includes, for example, a mirror that transmits a portion of light, and reflects another remaining portion of light. Alternatively, the light distribution element 72 may include a prism, etc.

Light emitted from the light source 71 is distributed into the HDR light $L_{H1}$ transmitting the light distribution element 72, and the SDR light $L_S$ reflected by the light distribution element 72, for example. The HDR light $L_{H1}$ passes through the first illumination optical system 12A, the first spatial light modulator, and the second illumination optical system 12B, and is guided to the fly-eye lens 21A by the optical path conversion element 12D and the optical path conversion element 12C. The SDR light $L_S$ is applied to the illumination optical system 15 by an optical path conversion element 73 and is guided from the illumination optical system 15 to the fly-eye lens 21A. More specifically, the SDR light $L_S$ passes through a first lens 15A and a second lens 15B of the illumination optical system 15 in this order to enter the fly-eye lens 21A. Each of the optical path conversion elements 12D and 73 includes, for example, a reflective mirror.

It is possible to set a ratio of the HDR light $L_{H1}$ to the SDR light $L_S$ to any value. For example, in a case where whole illuminance of output light quantity is increased, and a dynamic range is not relatively high, a ratio of the SDR light $L_S$ may be increased. Alternatively, in a case where the dynamic range is relatively high, and the whole illuminance of the output light quantity is decreased, a ratio of the HDR light $L_{H1}$ may be increased.

The technology is described thus far with reference to the embodiment and modification examples thereof; however, the technology is not limited to the above-described embodiment, etc., but various modifications may be made. For example, the component parts, the arrangements, the number, etc. of the optical sections exemplified in the above-described embodiment are merely illustrated, and it is unnecessary to provide all of the component parts, or any other component parts may be further provided.

For example, in the above-described modification example 1, the description is provided on a case where the first spatial light modulator 73 performs the phase modulation; however, a second spatial light modulator may perform the phase spatial modulation. In such a case, the projection optical system 17 may be omitted. Further, the integrator optical system may include an optical element other than a fly-eye lens or a rod integrator if such an optical element uniformizes incoming light.

It is to be noted that the effects mentioned herein are merely exemplified. The effects of the technology are not limited to the effects described herein, and may have any effects other than those described herein.

It is to be noted that the technology may be also configured as follows.

(1) A projection display unit including:
  a first spatial light modulator that first light enters; and
  an integrator optical system that second light and light passing through the first spatial light modulator enter.
(2) The projection display unit according to (1), further including a projection optical system that light passing through the integrator optical system enters.
(3) The projection display unit according to (2), further including a second spatial light modulator at an optical path between the integrator optical system and the projection optical system.
(4) The projection display unit according to (1), in which the integrator optical system includes a first fly-eye lens and a second fly-eye lens.
(5) The projection display unit according to (4), in which light transmitting the first spatial light modulator enters a single element of the first fly-eye lens.
(6) The projection display unit according to (4), in which light transmitting the first spatial light modulator enters a plurality of elements of the first fly-eye lens.
(7) The projection display unit according to (1), in which the integrator optical system includes a rod integrator.
(8) The projection display unit according to any one of (1) to (7), further including:
  a signal distribution circuit that distributes information on a high-luminance region from an image signal; and
  an HDR (High Dynamic Range) signal circuit that generates a signal to drive the first spatial light modulator on a basis of the information on the high-luminance region.
(9) The projection display unit according to any one of (1) to (8), further including:
  a first light source that generates the first light; and
  a second light source that generates the second light.
(10) The projection display unit according to (9), in which the first light source includes a red first light source, a green first light source, and a blue first light source; and the first spatial light modulator includes a red first spatial light modulator that light from the red first light source enters, a green first spatial light modulator that light from the green first light source enters, and a blue first spatial light modulator that light from the blue first light source enters.

(11) The projection display unit according to (8) or (9), in which the second light source includes a white light source.

(12) The projection display unit according to any one of (1) to (11), in which the first spatial light modulator performs intensity modulation for the first light.

(13) The projection display unit according to any one of (1) to (11), in which the first spatial light modulator performs phase modulation for the first light.

(14) The projection display unit according to any one of (1) to (8), in which the first light and the second light are generated by distributing light from a single light source.

This application claims the priority on the basis of Japanese Patent Application No. 2016-151709 filed on Aug. 2, 2016 with Japan Patent Office, the entire contents of which are incorporated in this application by reference.

Those skilled in the art could assume various modifications, combinations, subcombinations, and changes in accordance with design requirements and other contributing factors. However, it is understood that they are included within a scope of the attached claims or the equivalents thereof.

What is claimed is:

1. A projection display unit, comprising:
a first spatial light modulator that first light enters; and
an integrator optical system that second light and light passing through the first spatial light modulator enter,
wherein the integrator optical system includes a first fly-eye lens,
wherein the first light is High Dynamic Range (HDR) light and the second light is Standard Dynamic Range (SDR) light,
wherein the first spatial light modulator includes a transmissive liquid crystal panel,
wherein first light transmitted by the first spatial light modulator enters a single element of the first fly-eye lens,
wherein the single element is a center element of the first fly-eye lens, and
wherein second light enters a remainder of elements of the first fly-eye lens.

2. The projection display unit according to claim 1, further comprising a projection optical system that light passing through the integrator optical system enters.

3. The projection display unit according to claim 2, further comprising a second spatial light modulator at an optical path between the integrator optical system and the projection optical system.

4. The projection display unit according to claim 1, wherein the integrator optical system further includes a second fly-eye lens.

5. The projection display unit according to claim 1, further comprising:
a signal distribution circuit that distributes information on a high-luminance region from an image signal; and
an HDR signal circuit that generates a signal to drive the first spatial light modulator on a basis of the information on the high-luminance region.

6. The projection display unit according to claim 1, further comprising:
a first light source that generates the first light; and
a second light source that generates the second light.

7. The projection display unit according to claim 6, wherein
the first light source includes a red first light source, a green first light source, and a blue first light source; and
the first spatial light modulator includes a red first spatial light modulator that light from the red first light source enters, a green first spatial light modulator that light from the green first light source enters, and a blue first spatial light modulator that light from the blue first light source enters.

8. The projection display unit according to claim 6, wherein the second light source comprises a white light source.

9. The projection display unit according to claim 1, wherein the first spatial light modulator performs intensity modulation for the first light.

10. The projection display unit according to claim 1, wherein the first spatial light modulator performs phase modulation for the first light.

11. The projection display unit according to claim 1, wherein the first light and the second light are generated by distributing light from a single light source.

12. A projection display unit, comprising:
a first spatial light modulator that first light enters; and
an integrator optical system that second light and light passing through the first spatial light modulator enter,
wherein the integrator optical system includes a first fly-eye lens,
wherein the first light is High Dynamic Range (HDR) light and the second light is Standard Dynamic Range (SDR) light,
wherein the first spatial light modulator includes a transmissive liquid crystal panel,
wherein first light transmitted by the first spatial light modulator enters a single element of the first fly-eye lens,
wherein the single element is a corner element of the first fly-eye lens, and
wherein second light enters a remainder of elements of the first fly-eye lens.

13. The projection display unit according to claim 12, further comprising a projection optical system that light passing through the integrator optical system enters.

14. The projection display unit according to claim 13, further comprising a second spatial light modulator at an optical path between the integrator optical system and the projection optical system.

15. The projection display unit according to claim 12, wherein the integrator optical system further includes a second fly-eye lens.

16. A projection display unit, comprising:
a first spatial light modulator that first light enters; and
an integrator optical system that second light and light passing through the first spatial light modulator enter,
wherein the integrator optical system includes a first fly-eye lens,
wherein the first light is High Dynamic Range (HDR) light and the second light is Standard Dynamic Range (SDR) light,
wherein the first spatial light modulator includes a transmissive liquid crystal panel,
wherein first light transmitted by the first spatial light modulator enters a plurality of elements of the first fly-eye lens,
wherein identical images are formed at identical locations on the plurality of elements of the first fly-eye lens, and wherein second light enters a remainder of elements of the first fly-eye lens.

17. The projection display unit according to claim 16, further comprising a projection optical system that light passing through the integrator optical system enters.

18. The projection display unit according to claim 17, further comprising a second spatial light modulator at an optical path between the integrator optical system and the projection optical system.

19. The projection display unit according to claim 16, wherein the integrator optical system further includes a second fly-eye lens.

* * * * *